(12) United States Patent
Young et al.

(10) Patent No.: US 10,823,707 B2
(45) Date of Patent: Nov. 3, 2020

(54) ULTRASONIC CAP RADIUS PROBE PROVIDING CONSTANT FLUID PATH LENGTH

(71) Applicant: The Boeing Company, Chicago, IL (US)

(72) Inventors: Fred D. Young, Bellevue, WA (US); Hien Thuong Bui, Renton, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 15/990,223

(22) Filed: May 25, 2018

(65) Prior Publication Data

US 2019/0360973 A1 Nov. 28, 2019

(51) Int. Cl.
*G01N 29/22* (2006.01)
*G01N 29/28* (2006.01)
*G01N 29/04* (2006.01)

(52) U.S. Cl.
CPC ......... *G01N 29/225* (2013.01); *G01N 29/041* (2013.01); *G01N 29/28* (2013.01); *G01N 2291/106* (2013.01); *G01N 2291/2634* (2013.01)

(58) Field of Classification Search
CPC ..... G01N 29/225; G01N 29/041; G01N 29/29
USPC .......................................................... 73/640
See application file for complete search history.

(56) References Cited

U.S. PATENT DOCUMENTS

| | | | |
|---|---|---|---|
| 6,355,156 B1 * | 3/2002 | Li | B23H 3/02 204/222 |
| 9,201,047 B1 | 12/2015 | Walton | |
| 2004/0016299 A1 * | 1/2004 | Glascock | G01N 29/221 73/638 |
| 2013/0239689 A1 * | 9/2013 | Bbond-Thor | G01N 29/221 73/625 |
| 2014/0305217 A1 * | 10/2014 | Tapia | G01N 29/04 73/618 |

\* cited by examiner

*Primary Examiner* — Tarun Sinha
(74) *Attorney, Agent, or Firm* — Duft & Bornsen, PC

(57) ABSTRACT

Systems and methods are provided for ultrasonic inspection. One embodiment is a method for ultrasonic inspection. The method includes selecting an ultrasonic probe having an array of transducers arranged in an arc, placing the ultrasonic probe atop a surface of a part having a first radius of curvature, dynamically aligning the transducers of the array with respect to the surface, forming an ultrasonically conductive pathway between the transducers and the part, and inspecting the part via ultrasonic waves transmitted from the transducers.

23 Claims, 11 Drawing Sheets

ULTRASONIC CAP RADIUS PROBE PROVIDING CONSTANT FLUID PATH LENGTH

FIELD

The disclosure relates to the field of quality assurance, and in particular, to systems that inspect parts.

BACKGROUND

Stringers for aircraft come in a variety of shapes and sizes. For example, vent stringers for aircraft may comprise elongated bodies having rounded cross-sections. The radii of curvature of these cross-sections may vary depending upon location along the length of the body, and the cross sections may even include runouts and/or ramps that vary in size. These variations in design and shape allow the stringers to conform with any desired geometry in order to support aerodynamically shaped structural components.

Stringers for aircraft may be fabricated from a variety of materials, such as Carbon Fiber Reinforced Polymer (CFRP). CFRP provides enhanced strength at reduced weight when compared to other materials, and these properties are particularly desirable in aircraft. It is desirable to inspect the interior of CFRP stringers (i.e., within the composite material itself) via ultrasonic or other non-destructive techniques in order to identify any internal inconsistencies that are out of tolerance within the stringers in a non-destructive manner. However, the varying radii of curvature found in many stringers increases the difficulty of inspection of these parts. Therefore, it would be desirable to have a method and apparatus that take into account at least some of the issues discussed above, as well as other possible issues.

SUMMARY

Embodiments described herein provide ultrasonic probes which include an array of transducers arranged in an arc. By positioning the array based on the current radius of curvature of a part (e.g., a CFRP stringer), ultrasonic inspection may be rapidly performed upon the part in a consistent manner without distorting image quality. This reduces the amount of labor involved in inspecting the part.

One embodiment is a method for ultrasonic inspection. The method includes selecting an ultrasonic probe having an array of transducers arranged in an arc, placing the ultrasonic probe atop a surface of a part having a first radius of curvature, dynamically aligning the transducers of the array with respect to the surface, forming an ultrasonically conductive pathway between the transducers and the part, and inspecting the part via ultrasonic waves transmitted from the transducers.

A further embodiment is a non-transitory computer readable medium embodying programmed instructions which, when executed by a processor, are operable for performing a method for ultrasonic inspection. The method includes selecting an ultrasonic probe having an array of transducers arranged in an arc, placing the ultrasonic probe atop a surface of a part having a first radius of curvature, dynamically aligning the transducers of the array with respect to the surface, forming an ultrasonically conductive pathway between the transducers and the part, and inspecting the part via ultrasonic waves transmitted from the transducers.

A further embodiment is a method for ultrasonic inspection. The method includes transmitting ultrasonic waves from an array of transducers that are arranged in an arc, passing the ultrasonic waves from the transducers through an ultrasonically conductive pathway onto a surface of a part having a first radius of curvature that is concentric with the arc, and dynamically adjusting a position of the transducers relative to the surface.

Yet another embodiment is an apparatus for ultrasonic inspection. The apparatus includes an ultrasonic probe comprising a housing, an array that is disposed within the housing and comprises ultrasonic transducers, a proximity sensor, an inlet port for liquid, and a chamber disposed below the array that receives liquid from the inlet port and that directs the liquid onto the part, and forms an ultrasonically conductive pathway between the transducer and a part.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
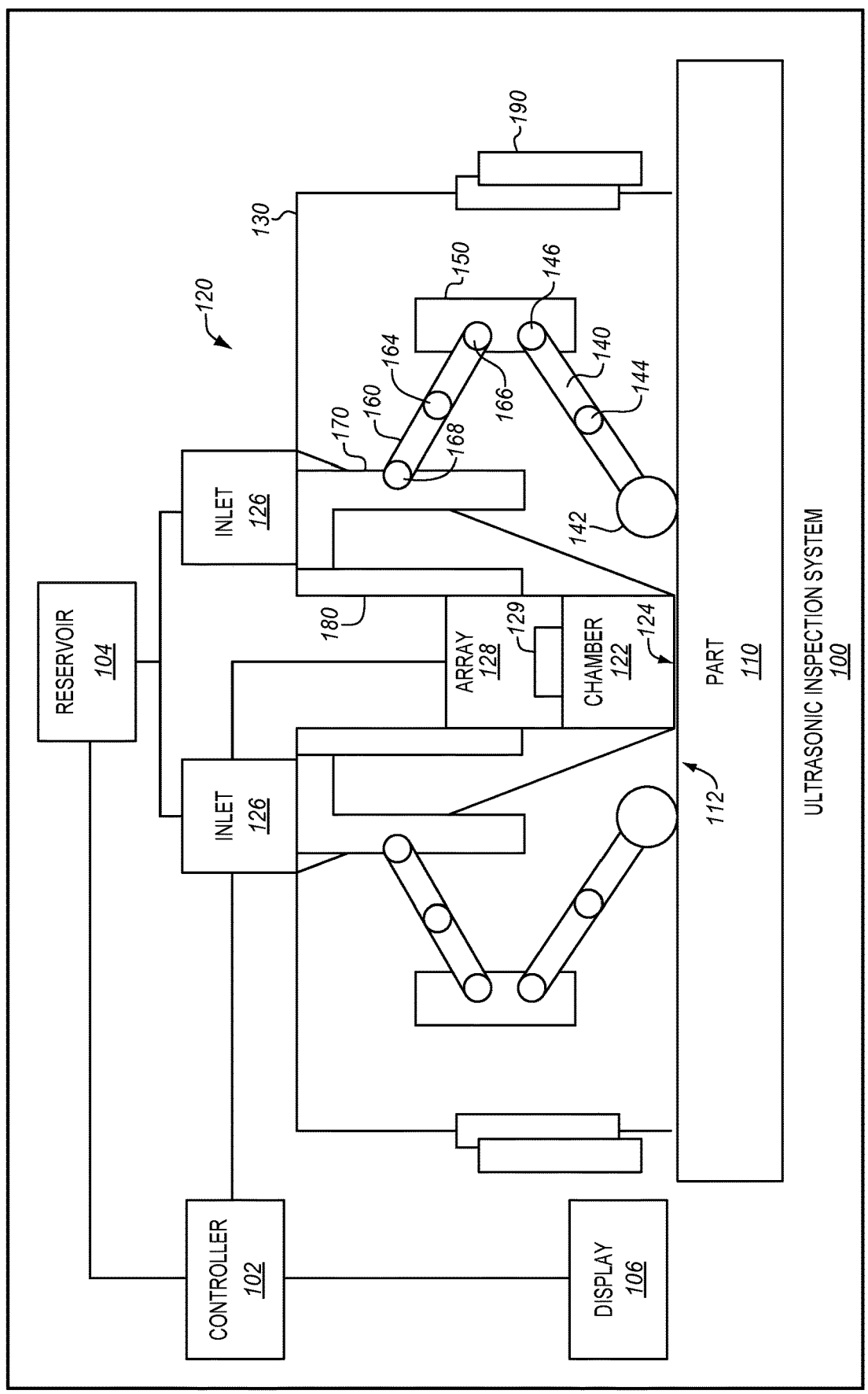
FIG. 1 is a block diagram of an ultrasonic probe in an illustrative embodiment.

FIG. 1 is a block diagram of an ultrasonic inspection system 100 in an illustrative embodiment. FIG. 1 illustrates that ultrasonic inspection system includes part 110, ultrasonic probe 120, controller 102, reservoir 104, and display 106. In this embodiment, controller 102 provides instructions to array 128 of transducers 129, and receives input which it utilizes to generate images for viewing on display 106 (e.g., a screen). Controller 102 may further provide instructions to reservoir 104 in order to initiate and/or terminate flow of liquid from reservoir 104 into inlets 126. Liquid flows from inlets 126 into chamber 122, and out through aperture 124 onto surface 112 of part 110. This establishes an ultrasonically conducive pathway (e.g. a continuous fluid pathway) between array 128 and surface 112, which enables ultrasonic imaging to be performed via transducers 129.

FIG. 1 also illustrates various mechanical components including bracket 180 which is attached to array 128 and may alter a position of array 128. Bracket 180 is also attached to bracket 170. Bracket 170 is attached to end 168 of inverter arm 160. Inverter arm 160 pivots about axis 164, and includes end 166 which is attached to frame 150. End 146 of lever arm 140 is also attached to frame 150. Lever arm 140 pivots about axis 144, and includes mobile end 142 (e.g., a wheel) that contacts surface 112. As the curvature of surface 112 changes, mobile end 142 is displaced, which alters the position of array 128 with respect to surface 112. This ensures that array 128 may place transducers 129 such that they are concentric with the current curvature of surface 112.

In further embodiments, mobile end 142 may be implemented in a spherical shape (e.g., such as a universal bearing). In a still further embodiment, a touchless proximity sensor system such as radar or lidar may be used to sense a curvature of surface 112. In response to sensing changes in curvature, ultrasonic probe 100 may command changes in array 128 maintaining desired ultrasonic transducer locations relative to surface 112. Thus, the features described herein may be used in an automated system held by a robot, and may be used even in circumstances where the robot never touches surface 112.

Figure 2:
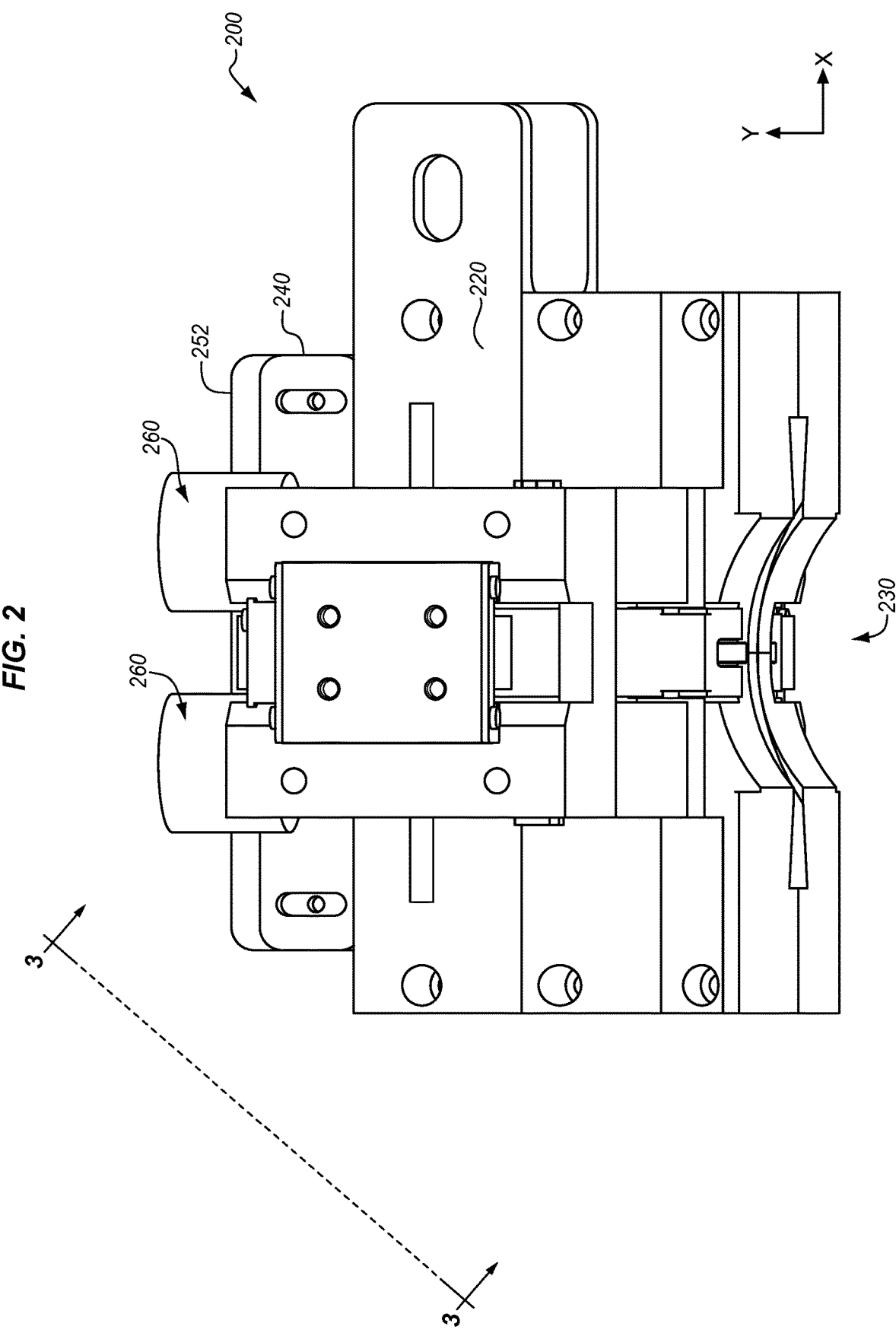
FIG. 2 is a perspective view of an ultrasonic probe in an illustrative embodiment.

FIG. 2 is a diagram of an ultrasonic probe 200 in an illustrative embodiment. Ultrasonic probe 200 comprises any system, device, or component operable to ultrasonically inspect a variety of locations on a part. In order to facilitate ultrasonic inspection, ultrasonic probe 200 applies liquid that create a fluid pathway that ultrasonically couples the probe to a part which is being imaged. Specifically, ultrasonic probe 200 includes inlets 260 which receive the liquid (e.g., water). The liquid travels from inlets 260 through an interior of ultrasonic probe 200, and leaves ultrasonic probe 200 via aperture 230. The liquid therefore provides a fluid pathway between an array of transducers at aperture 230 and the part that is being inspected by ultrasonic probe 200. The fluid pathway enables ultrasonic waves to travel between the array and the part being inspected. FIG. 2 also illustrates housing 220, which is coupled with bracket 240 and bracket 252. Housing 220, bracket 240, and bracket 252 form mechanical structure which provides integrity to ultrasonic probe 200.

Figure 3:
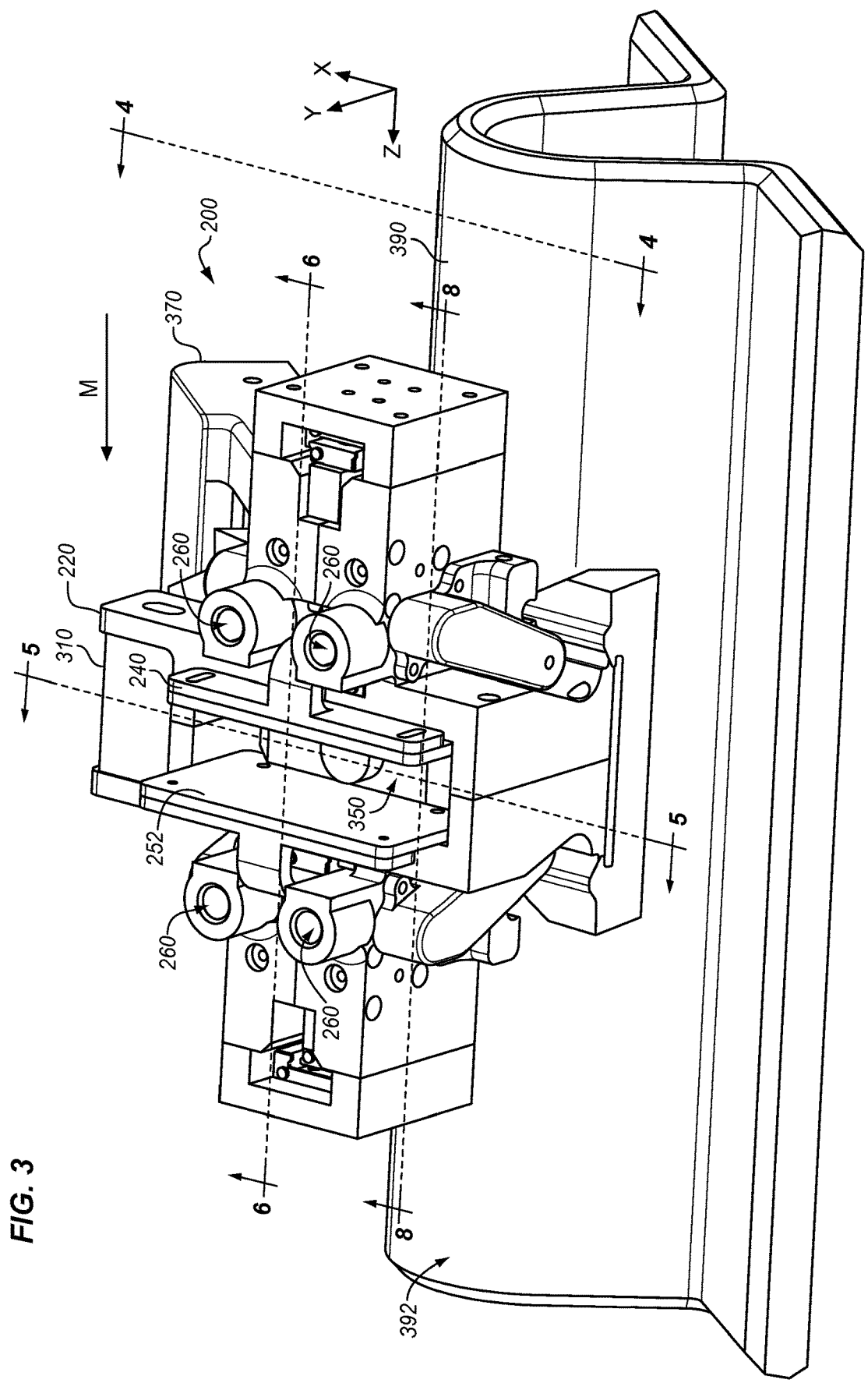
FIG. 3 is a perspective view of an ultrasonic probe that is inspecting a part in an illustrative embodiment.

FIG. 3 is a perspective view of an ultrasonic probe 200 that is inspecting a part 390 in an illustrative embodiment. FIG. 3 corresponds with view arrows 3 of FIG. 2. As shown in FIG. 3, ultrasonic probe 200 has been placed onto surface 392 of part 390. Ultrasonic probe 200 has been attached to bracket 370 in order to balance ultrasonic probe 200 upon surface 392 of part 390. That is, when bracket 370 is added to housing 220 of ultrasonic probe 200, the bracket 370 adjusts the center of mass of the ultrasonic probe 200. This prevents ultrasonic probe 200 from sliding off of the curvature of part 390. An additional housing 310 is also visible. Additional housing 310 is adjustably attached to housing 220.

From this view, array 350 of transducers is visible. Array 350 may be dynamically repositioned within ultrasonic probe 200 with respect to housing 220 and with respect to surface 392, even while ultrasonic probe 200 is being operated and moved along direction M. Thus, even though transducers within the array remain in the same position with respect to each other at array 350, the transducers may be moved as a group relative to surface 392. Dynamically repositioning the array 350 enables the array 350 to be aligned with a variety of different surface curvatures at part 390, as will be discussed below with regard to FIGS. 4-5. When the array 350 is properly aligned, image quality is enhanced, and the inspection process therefore provides more valuable data regarding the quality of part 390 being inspected. Further details of the dynamic repositioning of array 350 will be provided with regard to the following figures.

Figure 4:
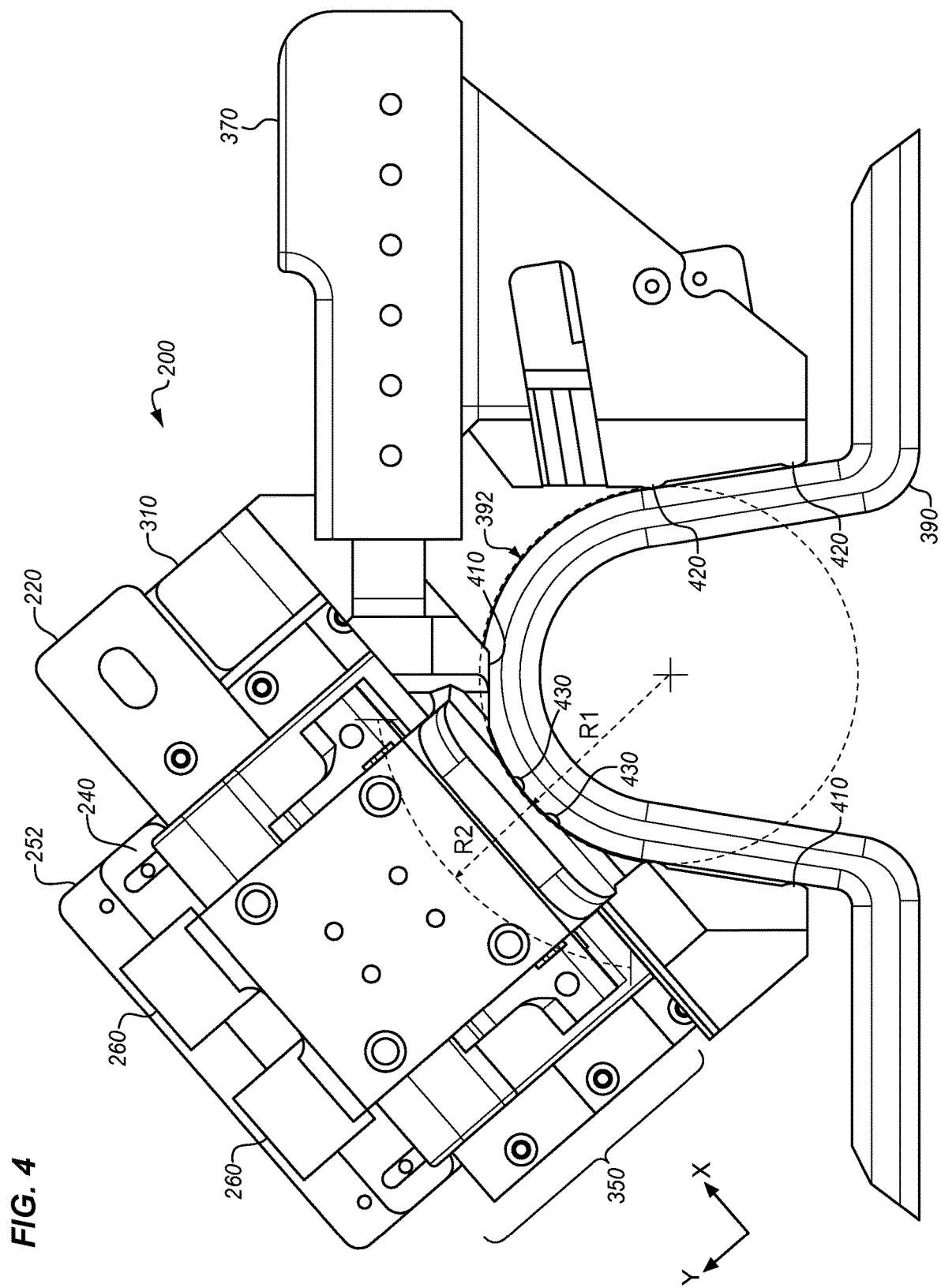
FIG. 4 is a side view of an ultrasonic probe that is inspecting a part in an illustrative embodiment.
Figure 5:
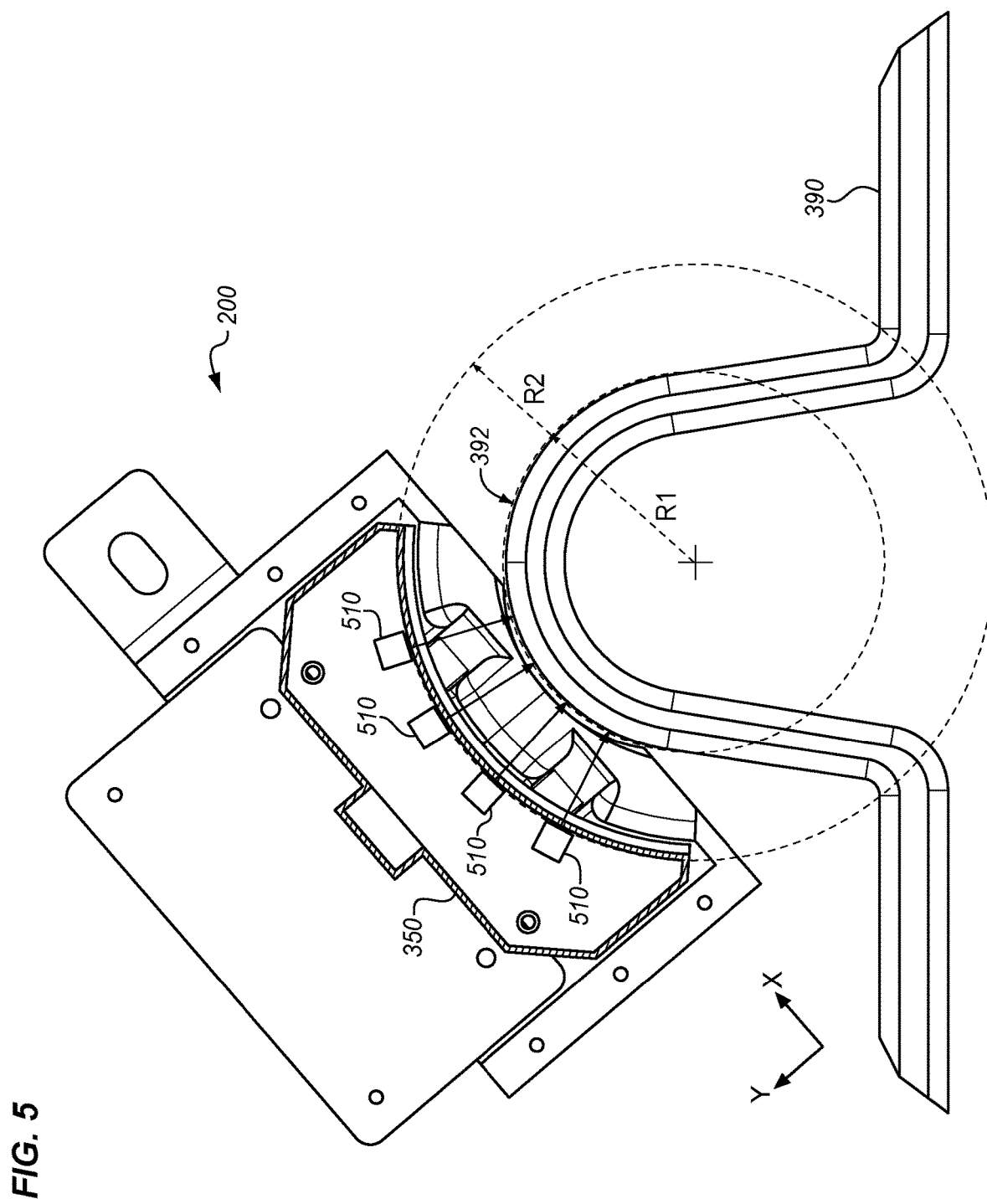
FIG. 5 is a section cut view of an ultrasonic probe that is inspecting a part in an illustrative embodiment.

FIGS. 4-5 illustrate how the array 350 may be positioned with respect to surface 392, which is curved. FIG. 4 is a side view of an ultrasonic probe 200 that is inspecting a part 390 in an illustrative embodiment. FIG. 4 corresponds with view arrows 4 of FIG. 3. As shown in FIG. 4, ultrasonic probe 200 is held in place at part 390 via contact points 410 at ultrasonic probe 200, and via contact points 420 at bracket 370. In this embodiment, weight at ultrasonic probe 200 and weight at bracket 370 is distributed such that ultrasonic probe 200 remains balanced upon part 390.

Mobile ends 430 (e.g., wheels, bearings, spherical ends) of ultrasonic probe 200 contact the surface 392 of part 390. Surface 392 has a radius of curvature R1 beneath ultrasonic probe 200. Array 350 is aligned such that its transducers are disposed along a second radius of curvature R2 that is concentric with the first radius of curvature. This concept is more fully illustrated at FIG. 5, which is a section cut view ultrasonic probe 200 that is inspecting a part in an illustrative embodiment.

FIG. 5 corresponds with view arrows 5 of FIG. 3. In FIG. 5, array 350 is exposed for view. Transducers 510 are also visible. Each transducer 510 has the same path length (in this case, R2) to surface 392 of part 390. This means that ultrasonic waves transmitted and received by transducers 510 travel the same distance, which means that timing for ultrasonic inspection is uniform across the transducers 500 of array 350. This arrangement provides a substantial benefit by ensuring that ultrasonic images acquired by ultrasonic probe 200 have consistent image quality and accuracy, even though surface 392 is curved. If the path lengths for the transducers 410 were different, then some transducers 510 could experience reduced signal quality and/or would need carefully calibrated timing sequences for handling ultrasonic waves.

Figure 6:
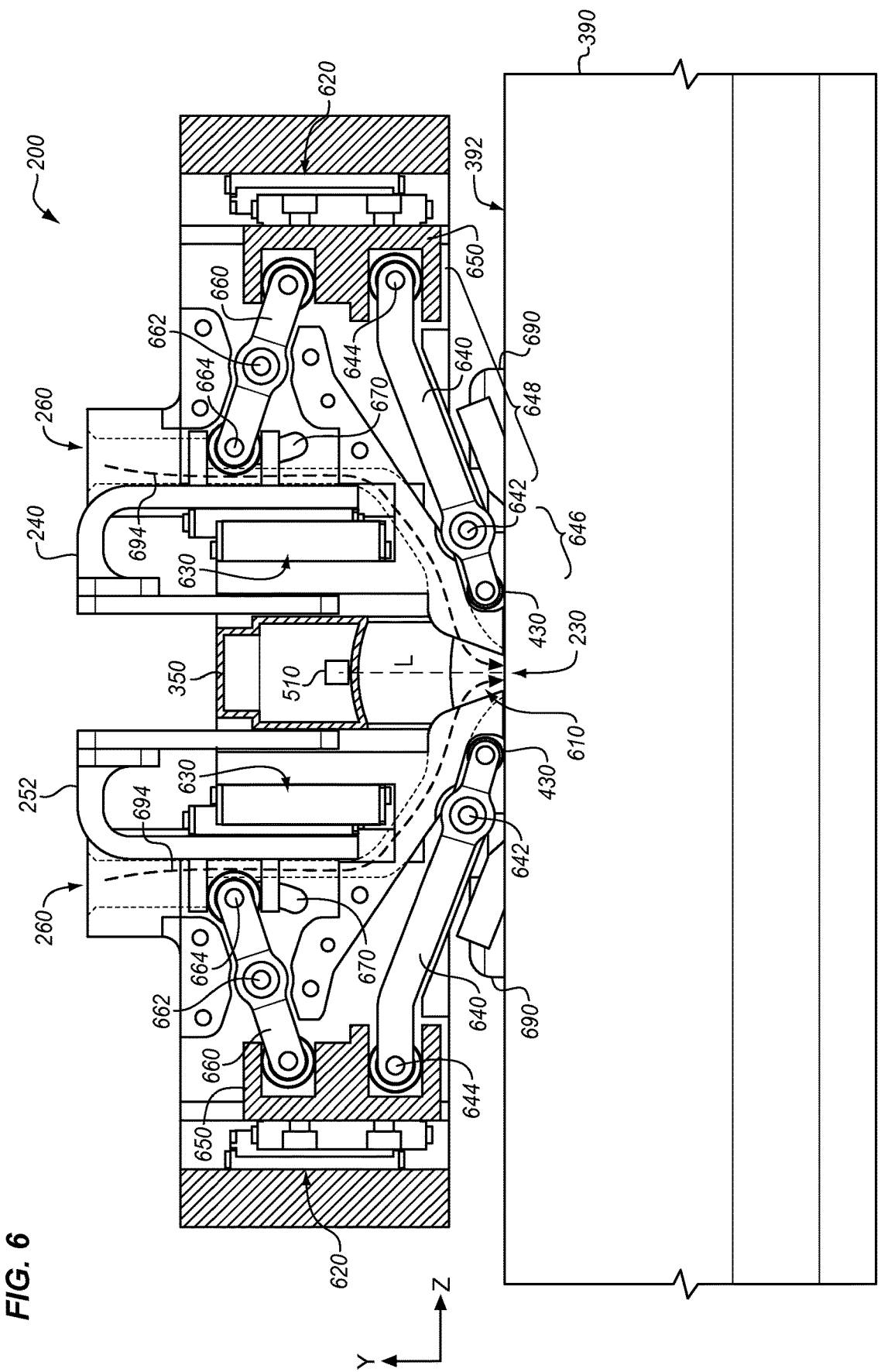
FIG. 6 is a section cut view of an ultrasonic probe that is inspecting a part in an illustrative embodiment.
Figure 7:
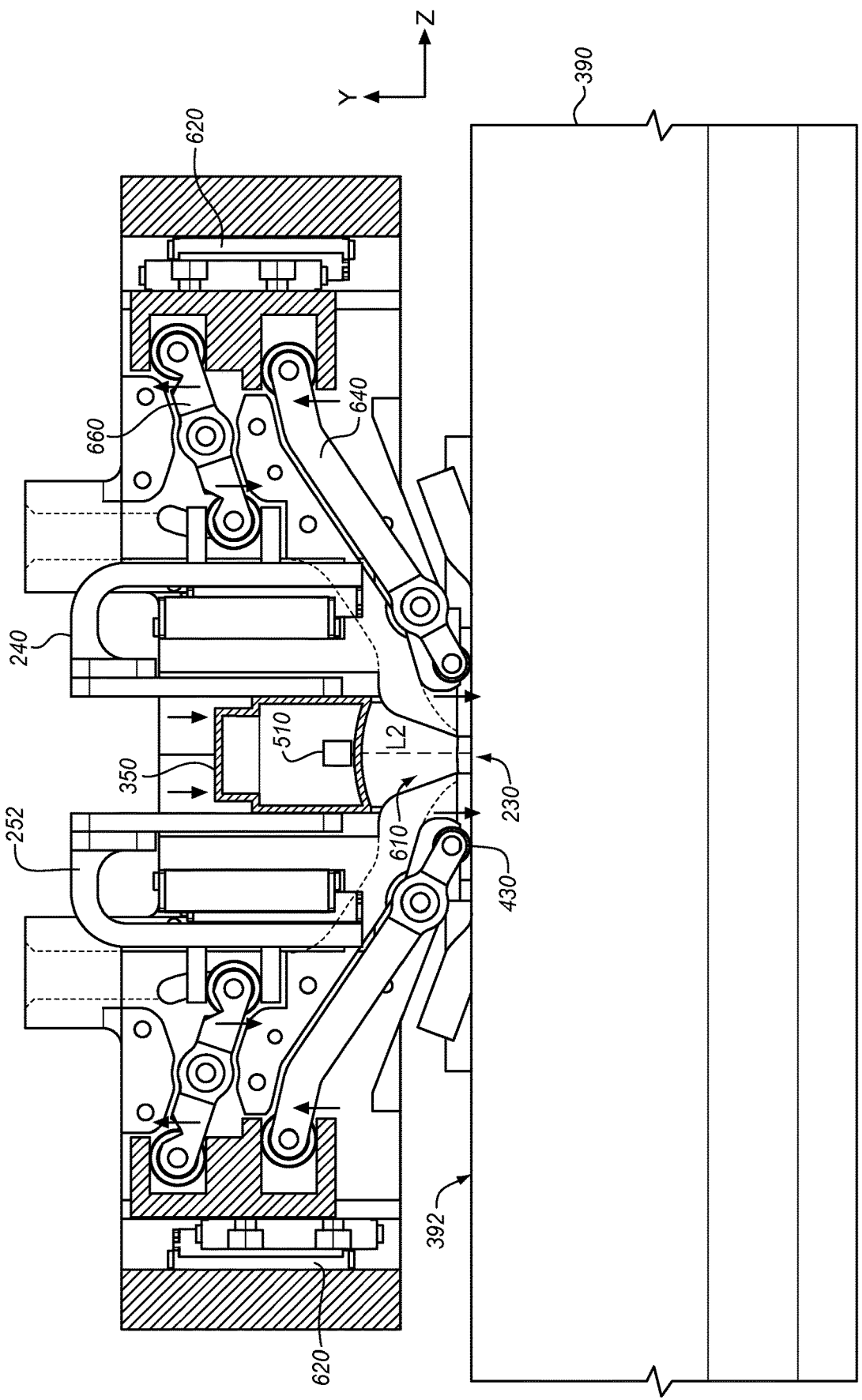
FIG. 7 is a further section cut view of an ultrasonic probe that is inspecting a part in an illustrative embodiment.

With an understanding of the position of array 350 with respect to surface 392 provided above, FIGS. 6-7 illustrate how a position of array 350 (and hence any transducers 510) may be dynamically adjusted relative to surface 392, in order to provide a uniform path length to each of its transducers 510 even when the radius of curvature of surface 392 varies FIG. 6 is a section cut view of an ultrasonic probe 200 that is inspecting a part 390 in an illustrative embodiment. FIG. 6 corresponds with view arrows 6 of FIG. 3. FIG. 6 illustrates that ultrasonic probe 200 includes lead-on tools 690 which facilitate placement of ultrasonic probe 200 onto surface 392.

Ultrasonic probe 200 also includes lever arms 640. Mobile ends 430 of lever arms 640 contact the surface 392 of part 390. In this section cut view, it can be seen that lever arms 640 are rotatably coupled with housing 220. A mounted end 644 is mechanically coupled with the array and displaces the array relative to the housing. Lever arms 640 pivot about axis 642, and contact the frames 650. A lever ratio of segments 648 to segments 646 of the lever arms 640 may be between two and ten (e.g., 4.3:1). When mobile ends 430 are displaced downwards, lever arms 640 push the frames 650 upward.

Inverter arms 660 mechanically couple the lever arms 640 to the array 350, and reverse the direction of forces applied by the lever arms 640. Specifically, inverter arms 660 contact the frames 650, and inverter arms 660 rotate about axes 662. Ends 664 of inverter arms 660 travel within cut-outs 670, and are coupled with bracket 240. This combination of features means that when the frames 650 are pushed upward in response to lever arms 640 changing angle (as shown in FIG. 7), the angle of inverter arms 660 also changes and array 350 is displaced downward (as shown in FIG. 7). This alters the length L of a fluid pathway between surface 392 and array 350 of transducers 510. L may for example be less than two inches, such as one and a tenth inches, as shown in FIG. 6 before the array 350 is displaced downwards. Meanwhile, L2 (the length after the array 350 has been displaced downward) may for example be less than one inch as shown in FIG. 7. Linear sliders 620 and linear sliders 630 provide mechanical support while enabling frames 650 and brackets 240 to move within ultrasonic probe 200.

FIG. 6 also illustrates that liquid may travel through inlets 260 into chamber 610 and out of ultrasonic probe 200 via aperture 230, along pathways 694. Chamber 610 receives liquid from the inlets 260 and that directs the liquid onto part 390. So long as ultrasonic probe 200 is held in place at surface 392, the amount of liquid entering through inlets 360 may meet or exceed the amount of liquid exiting the aperture 230. This causes chamber 610 to fill with the liquid, ensuring that fluid pathway exists between array 350 and surface 392. This enables ultrasonic waves to travel from transducers 510 to surface 392 and back along L.

FIG. 7 is a further section cut view of an ultrasonic probe 200 that is inspecting a part 390 in an illustrative embodiment, and has the same view angle as FIG. 7. In FIG. 7, ultrasonic probe 200 has moved to a location on surface 392 having a different curvature, which has caused mobile ends 430 to be displaced downward, which in the mechanical linkage created by lever arms 640 and inverter arms 660 to displace array 350 downwards towards surface 392. This reduces the fluid pathway length from L to L2. L2 may for example be less than an inch, such as three quarters of an inch. Thus even though transducers 510 remain in the same position along array 350, the displacement of array 350 ensures a constant fluid path length between the transducers 510 and the surface 392. In this embodiment, lever arms 640 and inverter arms 660 may be considered physical proximity sensors, although in further embodiments digital or electronic proximity sensors may be utilized.

In further embodiments, ultrasonic probe 100 may include features that enable transducers 510 to be repositioned relative to array 350. These features would further facilitate use of array 350 to inspect different radii of curvature in situ as ultrasonic probe 100 moves across the surface 392 during inspection. For example, the transducers 510 could be moved relative to the array 350 vertically, horizontally, or angularly in order to accommodate different contours of surface 392.

Figure 8:
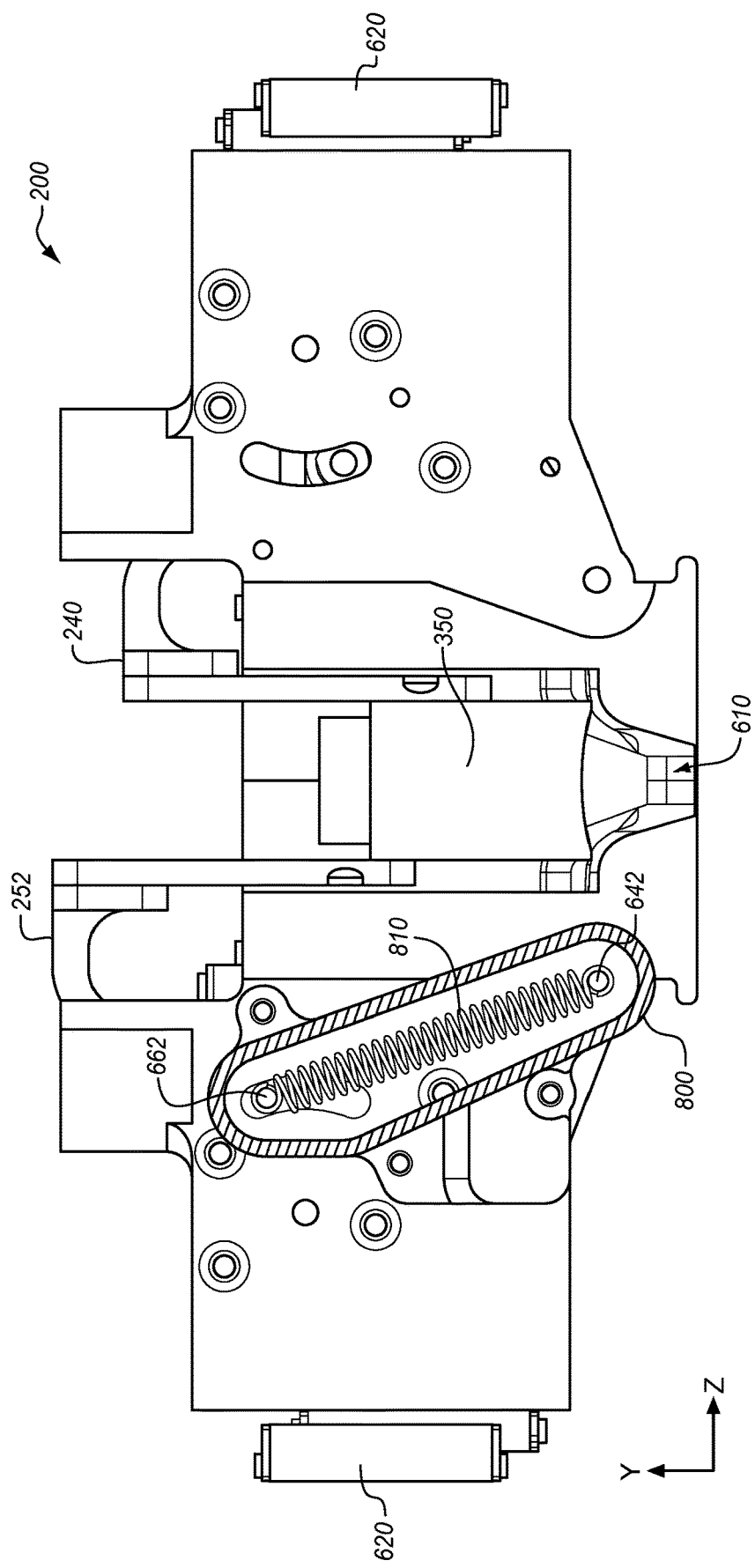
FIG. 8 is a further section cut view of an ultrasonic probe that illustrates a biasing device in an illustrative embodiment.

FIG. 8 illustrates a biasing feature which returns inverter arms 660 to a default position in the absence of applied force. Specifically, FIG. 8 is a further section cut view of an ultrasonic probe that illustrates a biasing device in an illustrative embodiment. FIG. 8 corresponds with view arrows 8 of FIG. 3., and illustrates a biasing device 810 (e.g., a helical spring, leaf spring, pressure vessel, etc.) located within a housing 800. Biasing device 810 is affixed to axis 642 of FIG. 6, and is also affixed to end 664 of inverter arm 660. This causes biasing device 810 to return inverter arm 660 (and hence array 350) to a default position/distance from surface 392 when forces are not applied via mobile ends 430. Phrased another way, biasing device 810 draws inverter arms 660 towards lever arms 640. This ensures that mobile ends 430 remain in contact with surface 392 as ultrasonic probe 200 travels across part 300.

Illustrative details of the operation of ultrasonic probe 200 will be discussed with regard to FIG. 9. Assume, for this embodiment, that a user wishes to inspect a part via ultrasonic probe 200.

Figure 9:
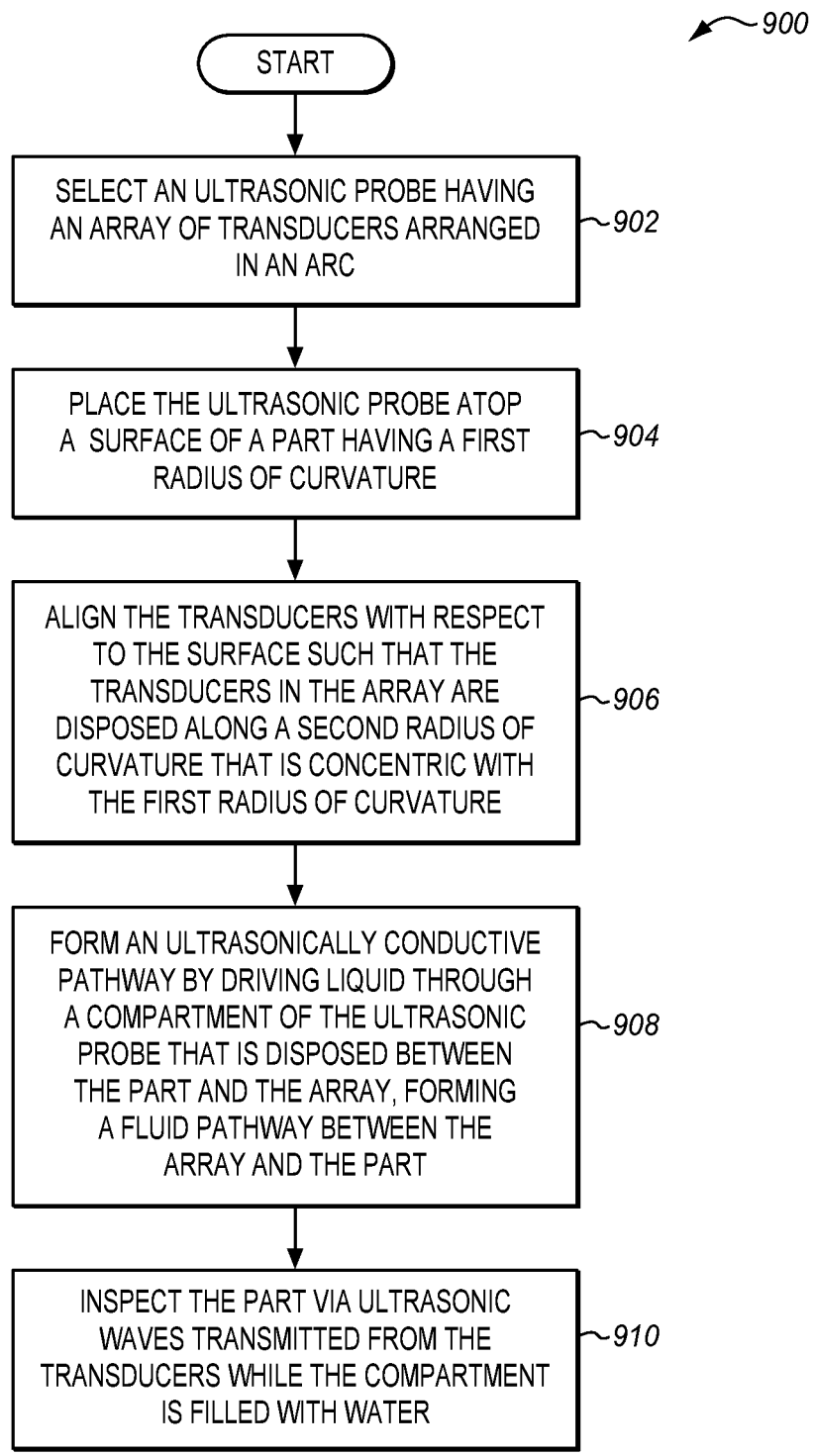
FIG. 9 is a flowchart illustrating a method for performing ultrasonic inspection of a part in an illustrative embodiment.

FIG. 9 is a flowchart illustrating a method 900 for performing ultrasonic inspection of a part in an illustrative embodiment in an illustrative embodiment. The steps of method 900 are described with reference to ultrasonic probe 200 of FIG. 2, but those skilled in the art will appreciate that method 900 may be performed in other systems. The steps of the flowcharts described herein are not all inclusive and may include other steps not shown. The steps described herein may also be performed in an alternative order.

In step 902, the user selects ultrasonic probe 200, which includes array 350 of transducers 510 arranged in an arc. The arcuate arrangement of the transducers 510, combined with the adjustable location of array 350, enables array 350 to provide a consistent path length to each of its transducers 510 when performing ultrasonic inspection.

In step 904, ultrasonic probe 200 is placed atop surface 392 of part 390. Surface 392 has a first radius of curvature R1. Ultrasonic probe 200 is held against surface 392, and this force displaces mobile ends 430 an amount based on the curvature of surface 392. When mobile ends 430 are displaced, they apply forces to lever arms 640 and inverter arms 660, which alters a position of array 350 with respect to aperture 230 (and hence surface 392) in a direction normal to surface 392. This action aligns the transducers 510 with respect to surface 392 such that the transducers 510 in the array 350 are disposed along a second radius of curvature that is concentric with the first radius of curvature (step 906). That is, a second radius of curvature has a center that is coincident with a center of the first radius of curvature. This causes the fluid path length between each transducer 510 and surface 392 to remain uniform, which provides enhanced image quality. In short, displacing the array 350 may be performed by adjusting a position of a lever arm 640 of ultrasonic probe 200 that is coupled with the array 350.

With ultrasonic probe 200 positioned and aligned, an ultrasonically conductive pathway is formed (step 908). To achieve this result, liquid is driven through chamber 610 of ultrasonic probe 200. Chamber 610 is disposed between part 390 and array 350, and the driving of liquid through chamber 610 forms a fluid pathway between array 350 and part 390. To provide higher levels of image quality, the liquid may be forced through ultrasonic probe 200 at a laminar speed/flow rate. Laminar flow provides a substantial benefit over turbulent flow, because turbulent flow generates noise that distorts or otherwise interferes with the ultrasonic imaging process. For example, flow rates for an exemplary system may comprise several gallons per minute across an aperture that is three quarters of an inch wide, or any other flow having a Reynolds number of less than two thousand one hundred.

With a fluid pathway formed, part 390 is inspected via ultrasonic waves (step 910). The ultrasonic waves are transmitted from the transducers while the compartment is filled with liquid. Ultrasonic probe 200 may further be moved across surface 392 to inspect part 390 along its length. That is, ultrasonic probe 200 is moved relative to surface 392 during ultrasonic imaging, or between ultrasonic images, in order to generate a series of images indicating internal features of part 390. Hence, ultrasonic probe 200, and any transducers within it, may traverse part 390 from an inspection start point to an end point, and may perform inspection continuously or intermittently as desired even when the contour of part 390 varies. For parts that have a varying first radius of curvature (R1), the method may also include dynamically aligning the array as the first radius of curvature varies while the ultrasonic probe is moved across the surface. In short, the process involves locating ultrasonic probe 200 on a particular surface curvature and then aligning the array 350 to the particular curvature and then moving the probe along the surface and dynamically aligning the array 350 (including its transducers 510 relative to the surface to form a desired radius relative to the surface (i.e., to match a second radius of curvature that is concentric with the radius of curvature of the surface/ This allows the ultrasonic probe 200 to move from one end of a complex contoured surface to the other end. This may be performed by holding ultrasonic probe 200 snugly against surface 392 while ultrasonic probe 200 is moved along part 390.

Figure 10:
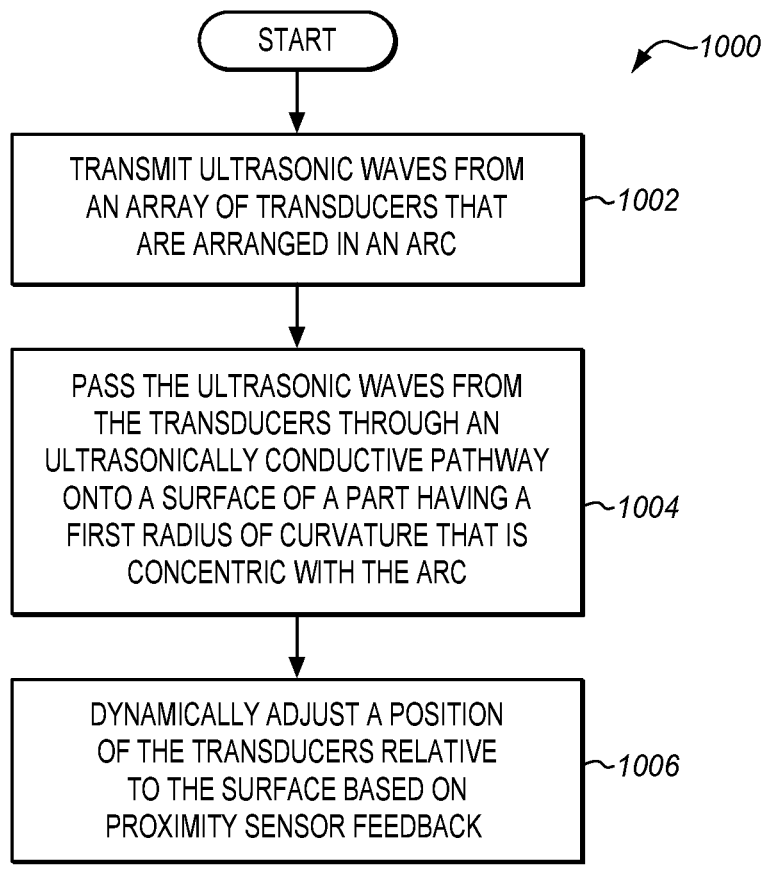
FIG. 10 is a flowchart illustrating a method for performing ultrasonic inspection of a part in an illustrative embodiment.

FIG. 10 is a flowchart illustrating a method 1000 for performing ultrasonic inspection of a part in an illustrative embodiment. According to FIG. 10, transducers 510, which are arranged in an arc at array 350, transmit ultrasonic waves in step 1002. The ultrasonic waves from the transducers pass through an ultrasonically conductive pathway (e.g., along the distance indicated by L in FIG. 6) onto a surface 392 of a part 390 having a first radius of curvature that is concentric with the arc (step 1004). The ultrasonic waves reflect off of the part 390, and are received for processing at the transducers 510. A position of the transducers relative to the surface is also adjusted dynamically, based on proximity sensor feedback (step 1006). This dynamic adjustment occurs because the ultrasonic probe 100 traverses the part 390 from one inspection start point to the end point and is inspecting continuously or intermittently, even as the contour of surface 392 varies.

In embodiments where the proximity sensor is implemented as a physical device (e.g., lever arm 640, etc.), the feedback from the proximity sensor may be a physical force. In contrast, electronic proximity sensors may provide feedback which it utilized to drive actuators at ultrasonic probe 100.

EXAMPLES

In the following examples, additional processes, systems, and methods are described in the context of ultrasonic probe having an adjustable array of transducers arranged in an arcuate manner.

Figure 11:
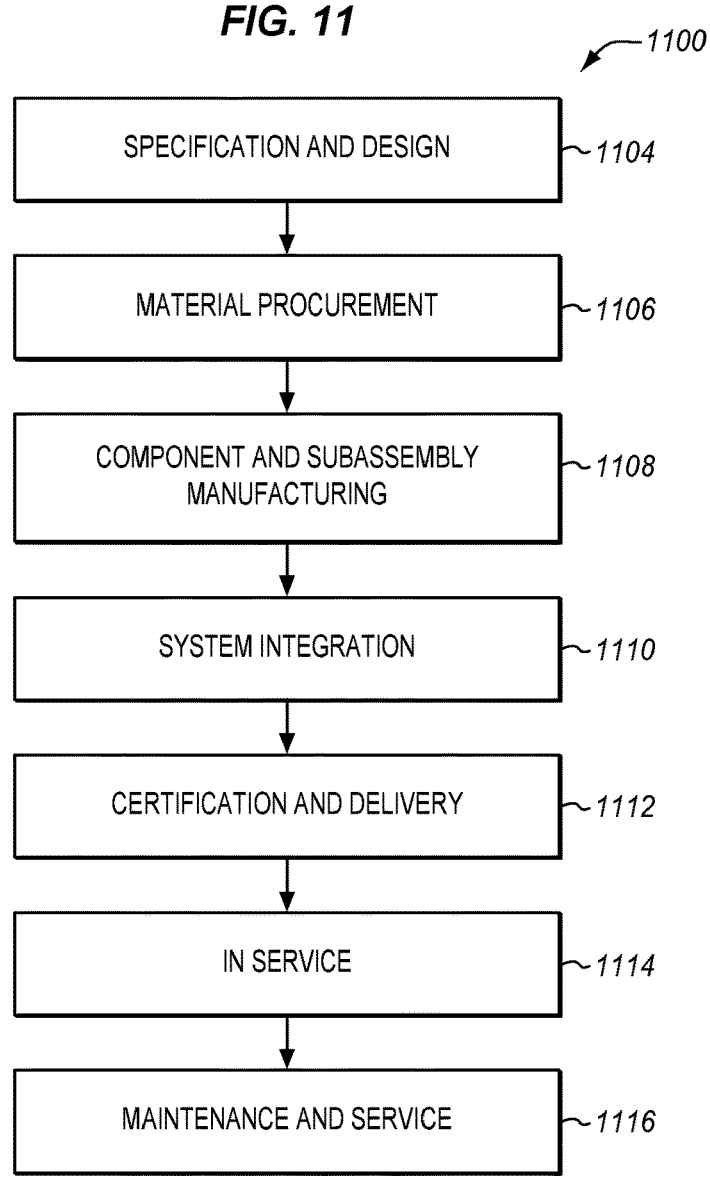
FIG. 11 is a flow diagram of aircraft production and service methodology in an illustrative embodiment.
Figure 12:
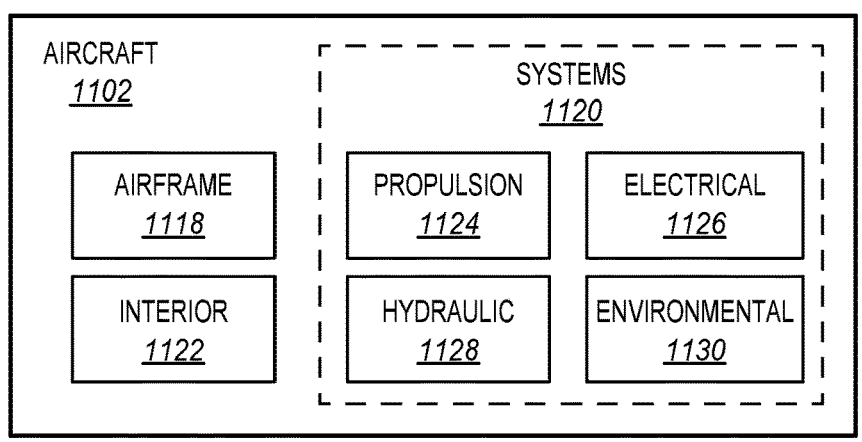
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic 1128, and/or environmental system 1130.

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to inspect new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for ultrasonic inspection comprising:
selecting an ultrasonic probe having an array of transducers arranged in an arc, and a housing that houses the array;
placing the housing of the ultrasonic probe against a surface of a part having a first radius of curvature;
dynamically aligning the transducers of the array with respect to the surface and to the housing, wherein the transducers remain in a position with respect to each other and are moved as a group relative to the surface;
forming an ultrasonically conductive pathway between the transducers and the part; and
inspecting the part via ultrasonic waves transmitted from the transducers.

2. The method of claim 1 wherein:
dynamically aligning the transducers is performed such that the transducers in the array are disposed along a second radius of curvature that is concentric with the first radius of curvature.

3. The method of claim 1 further comprising:
moving the ultrasonic probe across the surface; and
dynamically aligning the array as the first radius of curvature varies while the ultrasonic probe is moved across the surface.

4. The method of claim 1 wherein:
inspecting the part via ultrasonic waves is performed by transmitting the ultrasonic waves through a compartment that is filled with liquid.

5. The method of claim 4 further comprising:
aligning the compartment with the surface.

6. The method of claim 5 wherein:
aligning the compartment is performed dynamically.

7. The method of claim 1 wherein:
forming the ultrasonically conductive pathway comprises forming a fluid pathway between the transducers and the part.

8. The method of claim 7 wherein:
forming the fluid pathway comprises driving liquid through a compartment of the ultrasonic probe that is disposed between the part and the array.

9. The method of claim 8 wherein:
driving liquid through the ultrasonic probe is performed by forcing liquid through the ultrasonic probe at a laminar flow rate.

10. The method of claim 1 wherein:
aligning the transducers of the array is performed based on feedback from a proximity sensor of the ultrasonic probe.

11. The method of claim 10 wherein:
the proximity sensor comprises a lever arm.

12. The method of claim 1 wherein:
aligning the transducers of the array comprises displacing the array in a direction normal to the surface.

13. A portion of an aircraft assembled according to the method of claim 1.

14. A non-transitory computer readable medium embodying programmed instructions which, when executed by a processor, are operable for performing a method for ultrasonic inspection comprising:
selecting an ultrasonic probe having an array of transducers arranged in an arc, and a housing that houses the array;
placing the housing of the ultrasonic probe against a surface of a part having a first radius of curvature;
dynamically aligning the transducers of the array with respect to the surface and to the housing, wherein the transducers remain in a position with respect to each other and are moved as a group relative to the surface;
forming an ultrasonically conductive pathway between the transducers and the part; and
inspecting the part via ultrasonic waves transmitted from the transducers.

15. A portion of an aircraft assembled according to the method defined by the instructions stored on the computer readable medium of claim 14.

16. A method for ultrasonic inspection comprising:
transmitting ultrasonic waves from an array of transducers that are arranged in an arc within an ultrasonic probe;
passing the ultrasonic waves from the transducers through an ultrasonically conductive pathway onto a surface of a part having a first radius of curvature that is concentric with the arc; and
dynamically adjusting a position of the transducers relative to a housing and to the surface to maintain a uniform path length between each of the transducers and the surface as the ultrasonic probe moves over the surface.

17. An apparatus for ultrasonic inspection comprising:
an ultrasonic probe comprising:
- a housing;
- an array that is disposed within the housing and comprises ultrasonic transducers;
- a proximity sensor;
- an inlet port for liquid; and
- a chamber disposed below the array that receives liquid from the inlet port and that directs the liquid onto a part, and forms an ultrasonically conductive pathway between the transducer and the part,
- wherein the ultrasonic transducers are configured to move as a group relative to the housing based on feedback from the proximity sensor, and remain in a position with respect to each other.

18. The apparatus of claim 17 wherein:
the ultrasonically conductive pathway comprises a fluid pathway.

19. The apparatus of claim 17 wherein:
the proximity sensor comprises lever arms that are rotatably coupled with the housing, the lever arm comprising a mounted end that is mechanically coupled with the array and that displaces the array relative to the housing, and a mobile end configured to contact the part, and the apparatus further comprises:
an inverter arm that mechanically couples the lever arm to the array, and that reverses direction of forces applied by the lever arm.

20. The apparatus of claim 19 further comprising:
a biasing device that draws the inverter arm towards the lever arm.

21. The apparatus of claim 17 wherein:
the mobile end of the lever arm comprises a wheel.

22. The apparatus of claim 17 further comprising:
a bracket that is attached to the housing and that adjusts a center of mass of the ultrasonic probe.

23. Fabricating a portion of an aircraft using the apparatus of claim 17.

* * * * *